United States Patent
Chow et al.

(10) Patent No.: US 9,536,018 B2
(45) Date of Patent: Jan. 3, 2017

(54) COMPUTER-IMPLEMENTED METHOD OF IDENTIFYING A GROUP OF PERFORATIONS

(75) Inventors: Peter Chow, Gillingham Kent (JP); Tetsuyuki Kubota, Acton (GB)

(73) Assignee: FUJITSU LIMITED, Kawasaki (JP)

(*) Notice: Subject to any disclaimer, the term of this patent is extended or adjusted under 35 U.S.C. 154(b) by 607 days.

(21) Appl. No.: 14/115,241

(22) PCT Filed: May 3, 2011

(86) PCT No.: PCT/EP2011/057061
§ 371 (c)(1),
(2), (4) Date: Nov. 1, 2013

(87) PCT Pub. No.: WO2012/149960
PCT Pub. Date: Nov. 8, 2012

(65) Prior Publication Data
US 2014/0081604 A1    Mar. 20, 2014

(51) Int. Cl.
*G06F 17/50* (2006.01)

(52) U.S. Cl.
CPC ............ *G06F 17/50* (2013.01); *G06F 17/5018* (2013.01); *G06F 2217/16* (2013.01)

(58) Field of Classification Search
CPC ... G06F 17/50; G06F 17/5018; G06F 2217/16
USPC ................... 703/1; 700/97–98; 345/419–420
See application file for complete search history.

(56) References Cited

U.S. PATENT DOCUMENTS

| | | |
|---|---|---|
| 6,281,905 B1 | 8/2001 | Massabo et al. |
| 7,643,968 B1 | 1/2010 | Lambert et al. |

FOREIGN PATENT DOCUMENTS

| | | |
|---|---|---|
| EP | 0908850 A1 | 4/1999 |
| JP | 2000-172876 A | 6/2000 |
| JP | 2001-0344302 A | 12/2001 |
| JP | 2002-063222 A | 2/2002 |
| JP | 2003-141189 A | 5/2003 |
| JP | 2004-164269 A | 6/2004 |
| JP | 2007-199892 A | 8/2007 |
| WO | WO 2011/076905 A1 | 6/2011 |
| WO | WO 2011/076908 A2 | 6/2011 |

OTHER PUBLICATIONS

Ponamgi et al. "Incremental Algorithms for collision Detection Between Polygonal Models.". IEEE 1997, 14 Pages.*
Wang et al. "Automatic hole-filling of CAD models with feature-preserving". Computers & Graphics 36. 2012., 10 Pages.*
Japanese Office Action application No. 2014-508691 mailed Jan. 27, 2015.

(Continued)

*Primary Examiner* — Eun Kim
(74) *Attorney, Agent, or Firm* — Squire Patton Boggs (US) LLP

(57) ABSTRACT

A computer-implemented method of simplifying a geometrical model including through holes, by replacing perforations in the geometrical model, comprising: automatically identifying a potential group of perforations in a geometric model, and replacing the group of perforations with a porous replacement portion.

14 Claims, 16 Drawing Sheets

(56) References Cited

OTHER PUBLICATIONS

International Search Report and Written Opinion dated Jan. 3, 2012 corresponding to International Patent Application No. PCT/EP2011/057061.

Inna Turevsky et al., "Generalization of Topological Sensitivity and its Application to Defeaturing," 2007 Proceedings of the ASME International Design Engineering Technical Conferences and Computers and Information in Engineering Conference DETC 2007, Jan. 1, 2008, pp. 335-344, XP55015379.

Gilles Foucault et al., "Adaptation of CAD Model Topology for Finite Element Analysis," Computer Aided Design, Elsevier Publishers Bv., vol. 40, No. 2, Oct. 25, 2007, pp. 176-196, XP022458817.

Tassilo Glander et al., "Techniques for Generalizing Building Geometry of Complex Virtual 3D City Models," Jan. 1, 2008, pp. 1-21, XP55015245, retrieved from the Internet: http://www.hpi.uni-potsdam.de/fileadmin/hpi/FG_Doellner/publications/2008/GD08a/3dgeoinfo07_glander_doellner.pdf.

Graham Carey, "A Perspective on Adaptive Modeling and Meshing (AM & M)," Computer Methods in Applied Mechanics and Engineering, vol. 195, No. 4-6, Jan. 15, 2006, pp. 214-235, XP025042609.

Jason Williams et al., "Tightening: Curvature-Limiting Morphological Simplification," GVU Tech Report GIT-GVU-04-27, Jan. 1, 2005, pp. 1-5, XP55015240.

\* cited by examiner

Staggered layout part model
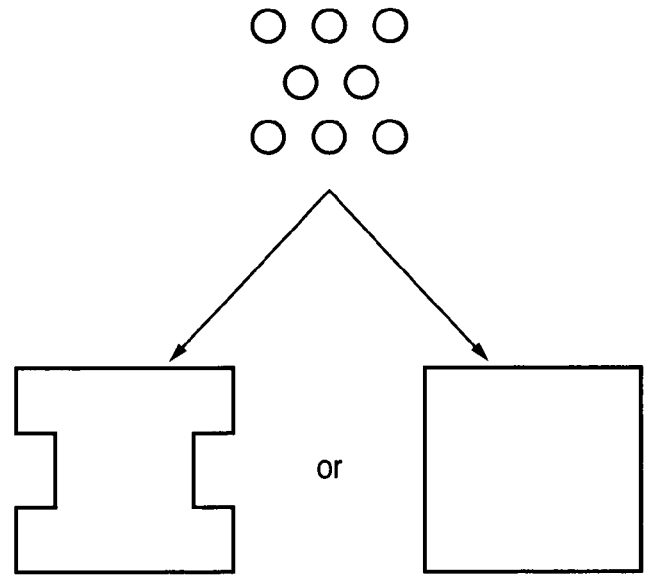
Body volume size, V
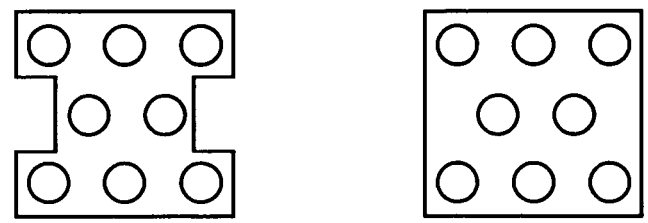
Temporary body volume size, Vn
FIG. 14

| Top Menu Bar [Exit] [Load & Save Model] [Auto Detect Feature] [User Pick Feature] [Process Feature { Result: Accept, Reject }] [Other Toolset]   50 |||
|---|---|---|
| Feature Menu Bar [Remove: [Small Parts] [Holes] [Blends] [Chamfers] [Cylinders] [etc.]] [Modify: [Holes] [Cylinders] [Perforated Sheets {Dn,Cn}] [etc.]]   60 |||
| Model Part Tree-View Window<br>CAD Model<br>->[ ] Part 1<br>->[X] Part 2<br>   ->[ ] Part 2a<br>   ->[ ] Part 2b<br>->[ ] Part 3<br><br>70 | Feature Tree-View Window<br><br>->[X] Feature 1<br>   {Group of holes}<br>->[X] Feature 2<br>   {Group of holes}<br>->[X] Feature 3<br><br>80 | 3D Selected Part Window<br><br><br><br><br><br><br><br>90 |
| 3D Model Display Window | Result Text Window | 3D Result Window |

FIG. 15

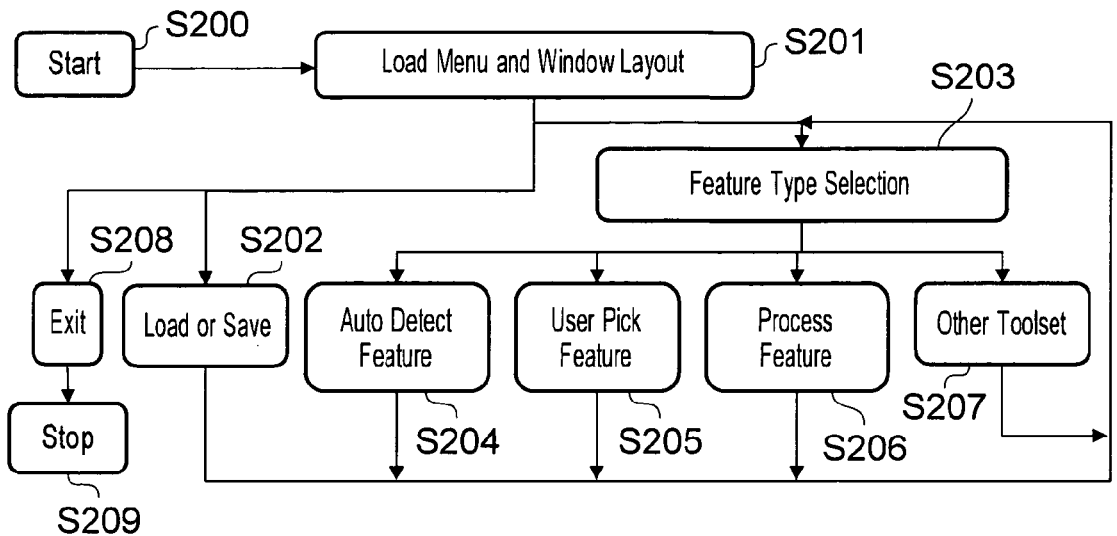
FIG. 16
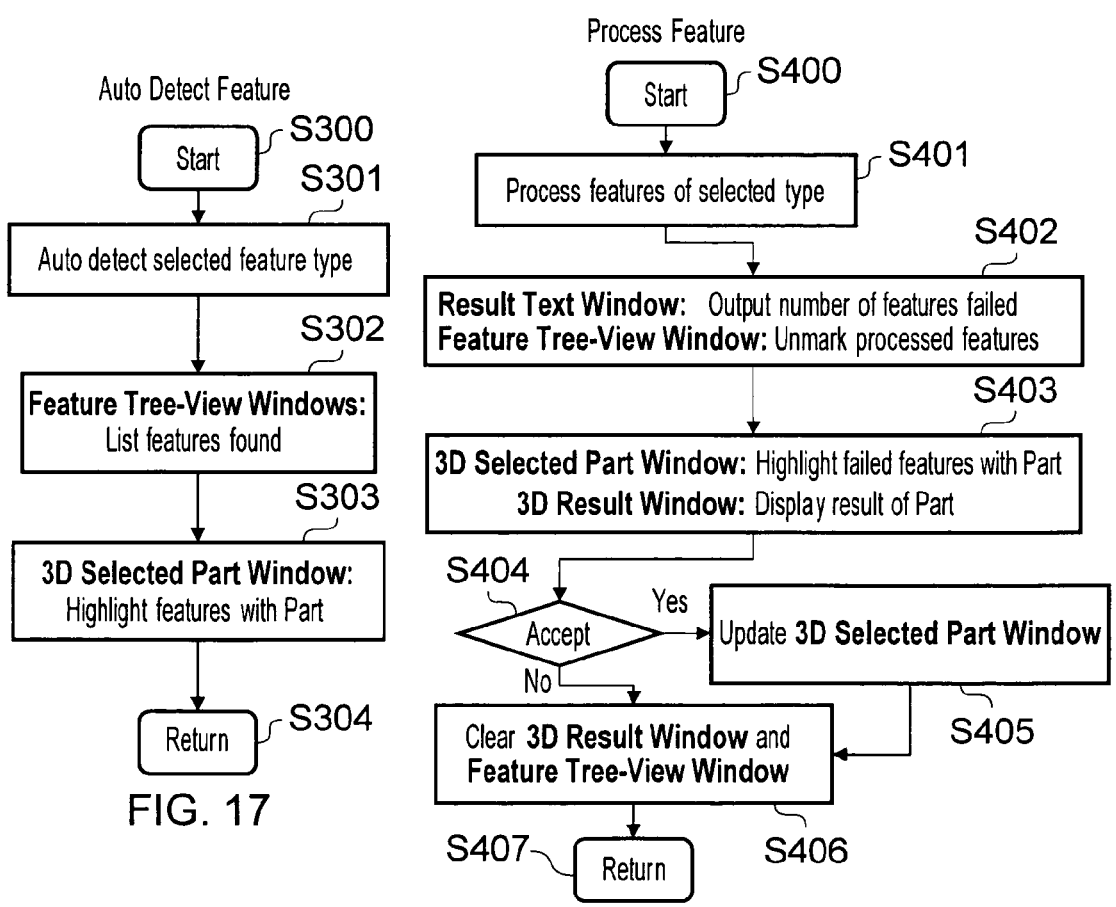
FIG. 17
FIG. 18

COMPUTER-IMPLEMENTED METHOD OF IDENTIFYING A GROUP OF PERFORATIONS

The present invention relates to computer-aided design and engineering. In particular it relates to potential adaptation of a model created of an object in a computer environment, in order to render that model more suitable for analysis.

This modification process is most commonly found in design and manufacturing processes. For example, an engineer may design a product prototype in the form of a component or complex part using a model in a CAD (computer-aided design) package such as AUTO CAD or Pro/ENGINEER and then wish to test the model for suitability of use. Such analysis of the virtual prototype/model may be required for specification requirements such as durability, health and safety demands and manufacturability. The design engineer may for instance wish to analyse the model in simulations to determine heat resistance, propagation of electromagnetic or other fields or stress-strain properties. This simulation process can refine product design without entailing the cost of actual manufacture and physical test. However, it is often necessary to modify the model so that it is simplified and can be more easily analysed.

One particular application of a modification process for a geometric model is in simplification of architectural models of buildings, for example for providing/improving airflow or ventilation or for fire simulation. Modification before airflow and thermal cooling simulation of models for heat producing electronic devices such as computer servers and mobile communications devices is a further, specific application.

FIG. 1 shows an overview of the simulation process chain frequently found in design and manufacturing processes. The primary stages are as follows:

1. Geometry Creation: this is creating a geometric model in the spatial domain. Models are commonly created using a Computer-Aided Design (CAD) system. If the CAD model is not correct, for example does not define a watertight solid or uses multiple definitions to cover a single plane, a CAD repair/merge stage may be required.
2. Model Setup: this is preparation, for example model modification, mesh generation and setup of model analysis conditions. Using an un-modified model directly for analysis is
3. possible but comes at a great expense in computing resources and analysis time. The common practice in industry is to include an intermediate stage called CAD-to-CAE model preparation (CCMP). This significantly reduces the model size (in terms of electronic storage) and prepares the model for various classes of analysis. Models usually require preparation in form of modification (sometimes known as defeaturing) to make them suitable for analysis/simulation. Until recently the CCMP stage has been labour intensive and largely a manual process. With the development of computer-aided tools that automatically detect and process features, efficiency has significantly improved. The next step in model set up is mesh generation. Automatic and fast mesh generation is available for both structured (finite difference) and unstructured (finite element) meshes. The final step, setting of model analysis conditions, is dependent on the type of analysis, such as heat flow analysis, fluid flow analysis and stress analysis.
4. Analysis: this is using a computer system to undertake simulation and analysis. Analysis may include calculation to numerical solution of properties such as mechanical stress, fluid flow and electromagnetic properties which are important in design and manufacturing. In the case of electronic products, the common analyses are finite element analysis (FEA) of stress/strain (in drop/crash tests), electromagnetic interference and thermal-fluid cooling. Analysis used to be the most time consuming stage in the entire process but using parallel processing and advanced numerical methods this is no longer the case. With stages 2 and 4, analysis is referred to as Computer-Aided Engineering (CAE).
5. Visualisation: this is the opportunity to view and interpret analysis results. Commonly, 3D animations and plots of field values against specific parameters such as time, energy, etc. are used to aid engineers and designers.

The present invention relates specifically to perforations in geometric models. Perforated sheets and other perforated parts are commonly used in electronic products for protective covering and at the same time to allow airflow in and out of the device, usually for cooling purposes. Such parts are especially important in computer devices, where heat management is critical to product efficiency and operation. Therefore, product designers and engineers employ thermal airflow analysis to address the heat management issue.

Running thermal airflow analysis or simulation is part of the computer-aided engineering (CAE) design and development process. Using perforated part geometry without modification requires fine meshes and complex setting of flow-rate conditions for each of the perforated holes next to the external boundaries defining the domain perimeter. Fine meshes lead to high computing resource demand and long analysis time. Moreover, setting conditions for individual perforated holes is extremely inefficient.

In thermal airflow analysis one related-art in-house advantageous practice is therefore to treat the perforated region as a single porous region. This greatly simplifies the geometry (from perforated to non-perforated) and minimises the required boundary and/or internal condition setting. The change to a porous equivalent has no significant impact on solution accuracy and is very efficient.

Thus, assuming the CAD model is correct (a watertight solid: if not a CAD repair stage is required) for CAE then using it directly for thermal airflow analysis is possible but comes at a great expense in computing resources and analysis time. The related-art practice for perforations is to include perforation modification in the intermediate CAD-to-CAE model preparation stage (CCMP). This significantly reduces the model size and prepares the model for other classes of analysis.

It is desirable to provide a more efficient method of detecting (and replacing) groups of perforations in a geometric model.

STATEMENTS OF INVENTION

In a first aspect of the invention there is provided a computer-implemented method of replacing perforations in a geometrical model, comprising automatically identifying a potential group of perforations in a geometric model including through holes, and replacing the group of perforations with a porous replacement portion.

Automatic detection and replacement with a porous equivalent is a simple and effective way of simplifying a geometrical model for analysis.

Any automatic identification algorithm can be used for identification/detection of the group of perforations. One way of achieving an automatic search for perforations might be to repeat searching around one or more detected holes (for example of the same shape and size) that form the perforated region to grow the area with a nearest neighbour approach until no more holes are detected, or the search goes outside a specified region or reaches the edge of a part. This methodology entails checking the detected holes list repeatedly until no more changes occur; it can take a long time when holes are listed randomly. The situation is further complicated by different kinds of perforated shapes and patterns as highlighted in FIG. 3 shown below.

A preferred identification methodology uses bounding boxes. According to preferred invention embodiments there is provided a computer-implemented method of identifying a potential group of perforations in a geometric model including through holes, comprising providing separate bounding box surrounding each through hole in a set of through holes; calculating the volume of each separate bounding box; increasing the size of each separate bounding box by a scaling factor, so that at least two of said separate bounding boxes overlap; creating a united set of all the bounding boxes, whereby overlapping separate bounding boxes become a single combined bounding box; reducing the size of each bounding box in the united set by the scaling factor; and extracting from the united set the one or more individual bodies formed by the one or more reduced-size bounding boxes, each individual body potentially representing a group of perforations. Replacement with a porous replacement portion can take place after detection.

Thus a preferred way of detection of perforations uses a bounding box method which can detect a group of perforations automatically. The methodology of preferred invention embodiments can group together separate through holes in an array (perforations) by using the adjacent location but without any kind of iterative searching process.

The solution of preferred invention embodiments requires no searching of any kind. Such invention embodiments use offsetting of (scaling of) the size of the bounding-box and unite and extract operations (both sometimes referred to as Boolean operations) to achieve the required result. The process can be the same for any kind of perforated shape and pattern of perforations.

Boolean operations as used in CAD applications are operations on sets which are known to the skilled person, such as the union operation, the intersection operation and the difference operation. Extraction reverses the union operation to separate the individual bodies in a united set, so that they can be treated individually.

The set of through holes available at the start of the methods described above may be the only through holes in a part or in an entire model, or there may be a selection process. For example, the methods may include the initial step of selecting the set of through holes so that it includes through holes having the same or a similar volume. This step looks for holes which can be replaced with the same level of porosity in a subsequent replacement stage. For example, a decorative perforated part might include holes of circular cross section interspersed with holes of triangular or square cross section. If these holes have the same or a similar volume (for example to within a given percentage, such as 25% but this is entirely dependent in the particular simulation), they could all be selected together as one set.

Additionally or alternatively, the methods could include as an initial step selecting the set of through holes so that it includes through holes having the same or a similar shape. In many scenarios a group of perforations is an array of holes of the same cross sectional shape and size, which are usually at least approximately equally spaced.

In preferred embodiments, if at least the volume of the through holes in the set is the same (to within normal error margins) of if a single bounding box volume is provided despite any differences in volume/shape of the through holes, then the step of calculating the volume of each separate bounding box may include only calculating the volume of one bounding box and using this volume for each separate bounding box.

In the method of preferred invention embodiments, the separate bounding boxes are increased in size by a scaling factor. This scaling factor can be any suitable scaling factor and could increase the size of the separate bounding boxes in one, two or three dimensions, depending on the implementation. This scaling factor may work as a function of the size of the bounding box, so that the effect is to multiply the size of the bounding box in any or all three dimensions by a factor which is more than one. Alternatively, the scaling factor may be an offset factor. This off-set factor adjusts the highest and lowest extent of a bounding box equally and oppositely. Such a scaling factor is not dependent on the original size of the bounding box. In preferred embodiments, the scaling factor is an offset factor, which adjusts the highest and lowest extent of the bounding boxes equally and oppositely in at least one of the mutually perpendicular x, y and z directions.

The numerical value of the scaling factor (such as the offset factor in some preferred embodiments) can be set at a default value and/or set by user input. The user input may be at the start of the method or during the method if the previous scaling factor was not sufficient to join adjacent bounding boxes to provide at least one single combined bounding box.

In some geometrical model parts, there may be a single set of perforations with no other through hole (or at least no other through hole of similar size and/or shape). However, in other situations it may be that a part has one or more single through holes included by virtue of its size and/or shape in a set of through holes but not forming one of an array of holes (group of perforations). Therefore, advantageously the methods of invention embodiments may further include deselecting any individual body whose volume corresponds to that of a separate bounding box, any remaining individual bodies each corresponding to an identified group of perforations.

The scaled-back individual bodies will either correspond to a combined bounding box including two or more perforations, or to a separate bounding box which has not been combined with any others in the unite step because it did not overlap with any other bounding boxes. It is this latter category of individual bodies that may be removed by comparing with an original volume to deselect individual bodies. If, as mentioned above, each separate bounding box starts with the same volume, the comparison is just against the known original volume of all the bounding boxes. If the original separate bounding boxes have different volumes, the comparison can be against an average volume, against the smallest volume of an original separate bounding box, against the largest volume of an original separate bounding box or against the volume of the original separate bounding box which has been scaled up and resized back to the original size. The skilled reader will appreciate that the comparison may take into account an error margin.

Once the individual bodies have been extracted from the united set, it may be that simplification of their shape is advantageous, again to reduce the requirement for computing resources in the analysis stage. This is not true if the individual body in question is rectangular in shape, but some arrays of through holes can produce more complex shapes when a single combined bounding box is created. For example, a staggered layout of perforations can produce a single combined bounding box with one or more concave features at at least one side, the concave features corresponding to a row of perforations which ends short of its two neighbours. Some examples of standard layouts leading to concave feature are shown in the staggered arrays of FIG. 3. It is advantageous to remove these concave features and invention embodiments may therefore include a further stage of processing the individual bodies to detect and replace any concave characteristics. This step may take place once individual bodies corresponding to a single perforation have been removed (to leave remaining individual bodies) or alternatively, detection of concave characteristics can take place before the deselection of individual perforations. In this latter case, the algorithm for processing the individual bodies will not detect any concave characteristics for those individual bodies corresponding to a single perforation because a bounding box of a single perforation will by nature not include concave characteristics.

The concave characteristics may be detected in any suitable fashion, for example by searching for surfaces on the individual bodies which have exactly two concave edges of the same size. In a further processing stage, the concave features may be replaced for one individual body by providing a cavity bounding box to fill in each cavity detected.

In some circumstances it may advantageous to make sure that the cavity bounding box is clearly united with the individual body to which it is attached. For example, use of floating point numbers and the inevitable rounding errors in calculation can lead to uncertainty as to whether the cavity bounding box and individual body overlap, are separated by a gap or have one shared surface. Preferably, the method of invention embodiments further includes increasing the dimensions of each cavity bounding box and the dimensions of the individual body by a cavity scaling factor, creating a united set of all the cavity bounding boxes and the individual body to combine the cavity bounding boxes and individual body, and decreasing the dimensions of the body thus created by the scaling factor. This methodology is similar to that used to identify a group of perforations, but has a different purpose in this context.

Once the individual bodies (or remaining individual bodies) are available, the next stage is to provide them with a porosity value so that they are equivalent to the perforations they are to replace. Thus, invention embodiments may further include deriving or at least using a porosity for each (remaining) individual body to provide a porous individual body as part of the geometric model, by taking into account porosity introduced by the through holes in the identified group of perforations.

It may be that the processing has stored the number, and if necessary also the volume, of holes and that this volume can be allocated to individual bodies. This may well be true, for example, if the uniting operation has created a single individual body from the set of through holes and thus a single group of perforations has been identified. In that case, it should be possible to derive porosity using this information. However, in other circumstances, the Boolean union operation can mean that there is no longer a link between the through holes and the individual bodies. In these circumstances, a temporary body may be created for each individual body, for the purposes of porosity calculation only, by Boolean intersection of the individual body with the part model. This temporary part is thus identical in size, position and shape to the individual body but its volume is reduced by the group of perforations. The porosity of the individual body may be derived by then using a ratio between the volume of the individual body and the volume of the temporary part. The ratio value may be, for example, 1.0—(volume of the temporary part/volume of the individual body).

Subsequently, the temporary body is discarded.

Once the individual body has been given the calculated porosity that provides an equivalent airflow to the perforations within the previously included volume taken up by individual body, the processing is complete. In some systems, it may be that a specific step is required for this final outcome, in others the individual body which has already been defined will have automatically replaced the corresponding portion of the geometric model and thus removed the through holes.

In a preferred embodiment, the individual body is already present in the model (once it has been derived) and a final replacement step removes the perforations, for example by Boolean subtraction. This Boolean subtraction may remove the portion of the original model which intersects with each individual body.

As an aside, since porosity can be derived using a ratio between the volume of the individual body and the volume of the temporary part, it is at this stage in the process that individual bodies representing a single through hole only can be easily deselected from further consideration, using the simple volume calculation explained above.

According to a further aspect of the invention, which may be freely combined with the other aspects, invention embodiments provide a graphical user interface for a computer-implemented method of identifying a potential group of perforations in a geometric model including through holes; wherein the graphical user interface when operated displays the geometric model including the through holes; allows manual selection of an automatic perforation detection and replacement procedure which groups together the through holes forming an array of holes and optionally replaces the array with a porous region giving the same air flow characteristics; and displays the geometric model after the replacement.

The grouping may be using the nearest neighbour approach or bounding box manipulation and Boolean operations, as set out in more detail hereinbefore.

The graphical user interface may also provide functionality for input of a scaling factor and for inputting criteria for selecting a set of through holes. There may be a suitable metal layout for selecting perforation processing, and for selecting individual arrays of holes (for detection of perforations and the possible subsequent replacement steps).

The exact perforation detection and replacement procedure may take place according to a method as described hereinbefore.

A graphical user interface (GUI) is commonly provided as a computer software tool executed on a computing device such as a terminal which has at least a screen for display and input means for the user, such as a keyboard and mouse arrangement.

According to this aspect of the invention the GUI can allow viewing and/or manual input in the CCMP stage, facilitating adaptation of the perforation routine if necessary.

According to a still further aspect of the invention, invention embodiments provide a computer program which when executed on a computing device provides the graphical user interface according to any of the preceding graphical user interface description or carries out the method of any of the preceding method description.

According to a still further aspect of the invention, invention embodiments provide a computer apparatus arranged to automatically simplify a geometrical model including through holes for analysis, by replacing perforations in the geometrical model, comprising an identifier operable to identify a potential group of perforations in a geometric model including through holes, and a replacer operable to replace the identified group of perforations with a porous replacement portion.

According to a last aspect of the present invention, preferred invention embodiments provide a computer apparatus arranged to identify a potential group of perforations in a geometric model including through holes, comprising a bounding box provider arranged to provide a separate bounding box surrounding each through hole in a set of through holes; a bounding box volume calculator arranged to calculate the volume of each separate bounding box; a bounding box size increaser arranged to increase the size of each separate bounding box by a scaling factor, so that at least two of said separate bounding boxes overlap; a Boolean union operator arranged to create a united set of all the bounding boxes, whereby overlapping separate bounding boxes become a single combined bounding box; a bounding box size reducer arranged to reduce the size of each bounding box in the united set by the scaling factor; and an extractor arranged to extract from the united set the one or more individual bodies formed by the one or more reduced-size bounding boxes, each individual body potentially representing a group of perforations.

The skilled reader will appreciate that the functional items described above (identifier, bounding box provider etc) with respect to the computing apparatus may be embodied as one or more suitably programmed processors accessing memory and input/output devices as necessary. The same processor or processors may act as any or all of the functional items.

If the apparatus is programmed to modify the array of perforations as well as indentifying them, the computer apparatus (or GUI) may further comprise input functionality to read in a CAD file, output functionality to output a modified CAD file, and computing capacity operable to carry out the method of any of the preceding claims. A further stage potentially carried out by the apparatus is airflow and/or thermal cooling analysis of the modified model.

The computer apparatus may be provided as a computer aided engineering system, which may comprise a single computing device or a network of linked devices having central or distributed computing resources, such as memory and processing capability. In the latter case the method and any GUI functionality may be shared between users at different terminals. The input functionality may read in a CAD file and the output functionality may produce a CAD file of the same or a different format.

Features and sub-features of any of the aspects all form part of the same general invention concept and may be freely combined unless clearly incompatible.

DETAILED DESCRIPTION

Preferred features of the present invention will now be described, purely by way of example, with reference to the accompanying drawings, in which:

FIG. 14 is a schematic depiction of a part with different options for temporary body size and shape;

FIG. 15 is an outline view of a GUI display environment;

FIG. 16 shows a flowchart of basic GUI processing;

FIG. 17 shows a flowchart of the GUI auto detector feature;

FIG. 18 shows a flowchart of detailed GUI feature processing;

Until recently the CCMP stage was labour intensive and largely a manual process. With the development of computer-aided tools that automatically detect and process features the efficiency for this stage has improved significantly, reducing the required time from weeks to days. For example, using recently developed software, a computer server model for thermal airflow analysis that previously took 14 days to prepare can now be done in 5 days with a future target of just 1 day. The perforated sheet is one of many intricate features commonly found in server models and many other devices. Automatic detection and modification of such features will further increase model preparation efficiency.

Other perforated applications in computational fluid dynamics simulation include ventilation of rooms and buildings including, for example, smaller parts with perforations as well as models with perforated raised floors and perforated panels in air conditioning unit inlets/outlets in data centres.

Figure 1:
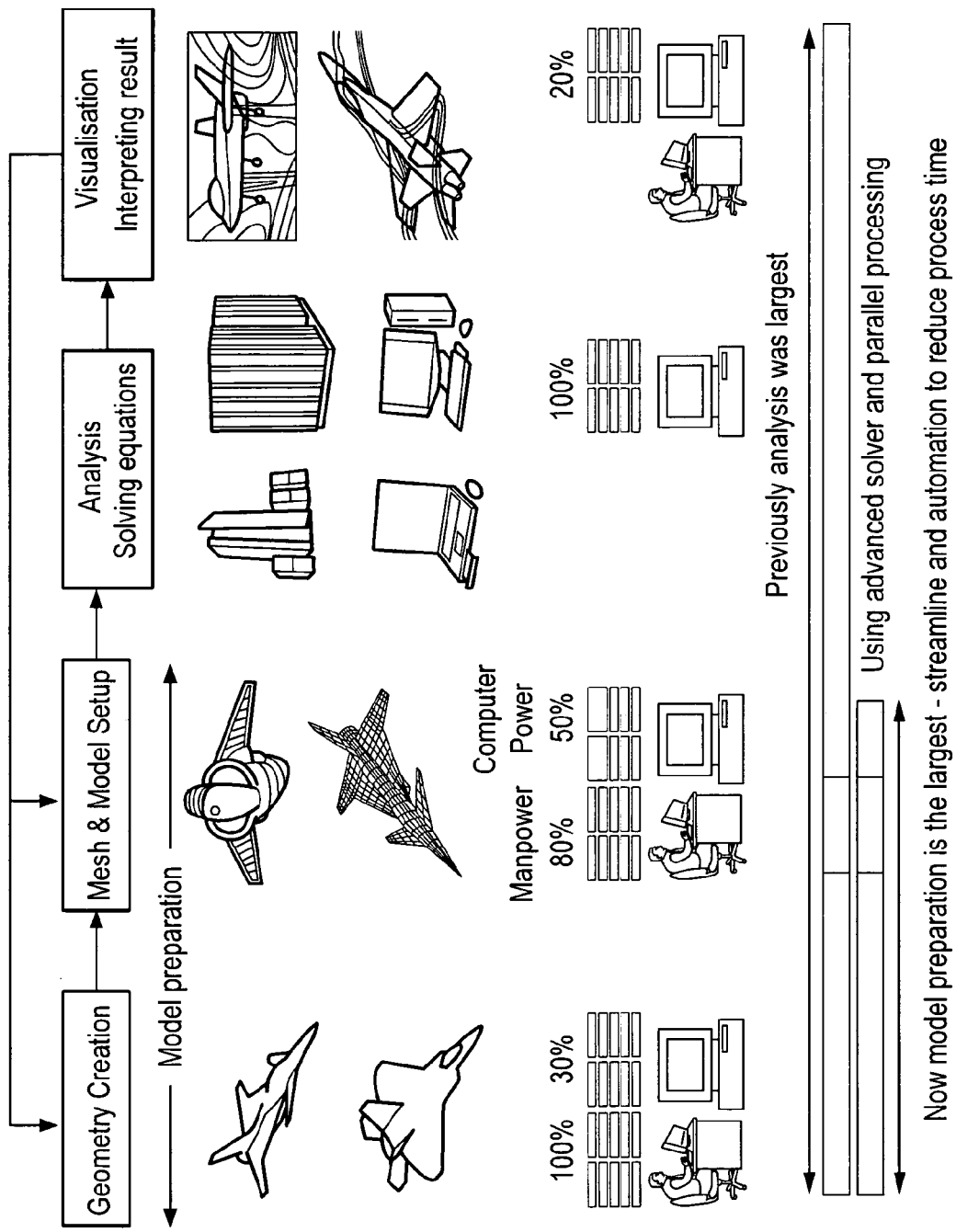
FIG. 1 is a schematic diagram showing a simulation process chain and processing time.
Figure 2:
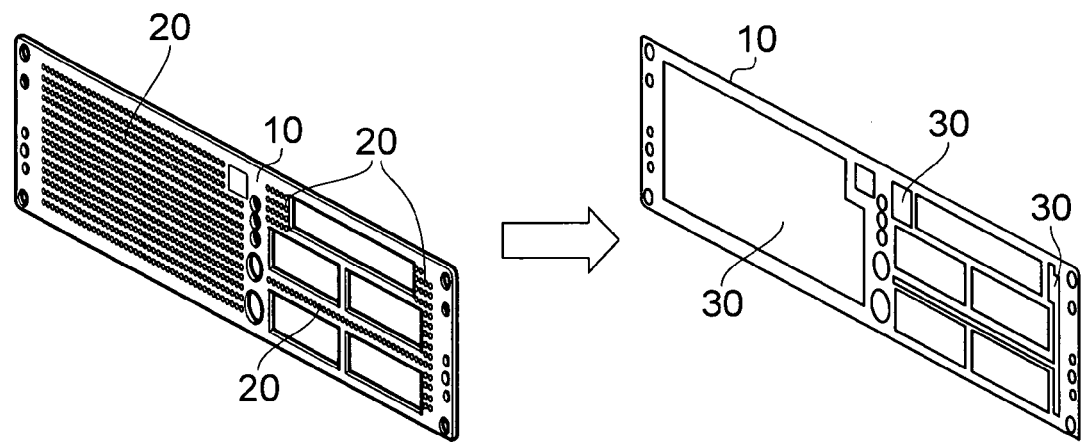
FIG. 2 is an example of modification of a perforated sheet to replace the perforations with porous regions.

In the majority of CCMP cases, once the required feature has been detected, the processing part is relatively straightforward, such as removing the feature. This is not the case with the discussed processing of perforated part features for such simulations, because the perforations are to be replaced with equivalent porosity. As mentioned above, the requirement is to modify the perforated area and prepare it ready for porous condition setting. FIG. 2 shows a part before and after such a modification. The part shown is a perforated sheet, 10, with several different arrays of perforations, 20, and other features, such a larger circular through holes and larger rectangular cross-section through holes. The darker regions 30 in the "after" figure are new elements that have replaced the perforated holes in the model. Three new subparts have been created for the model.

Figure 3:
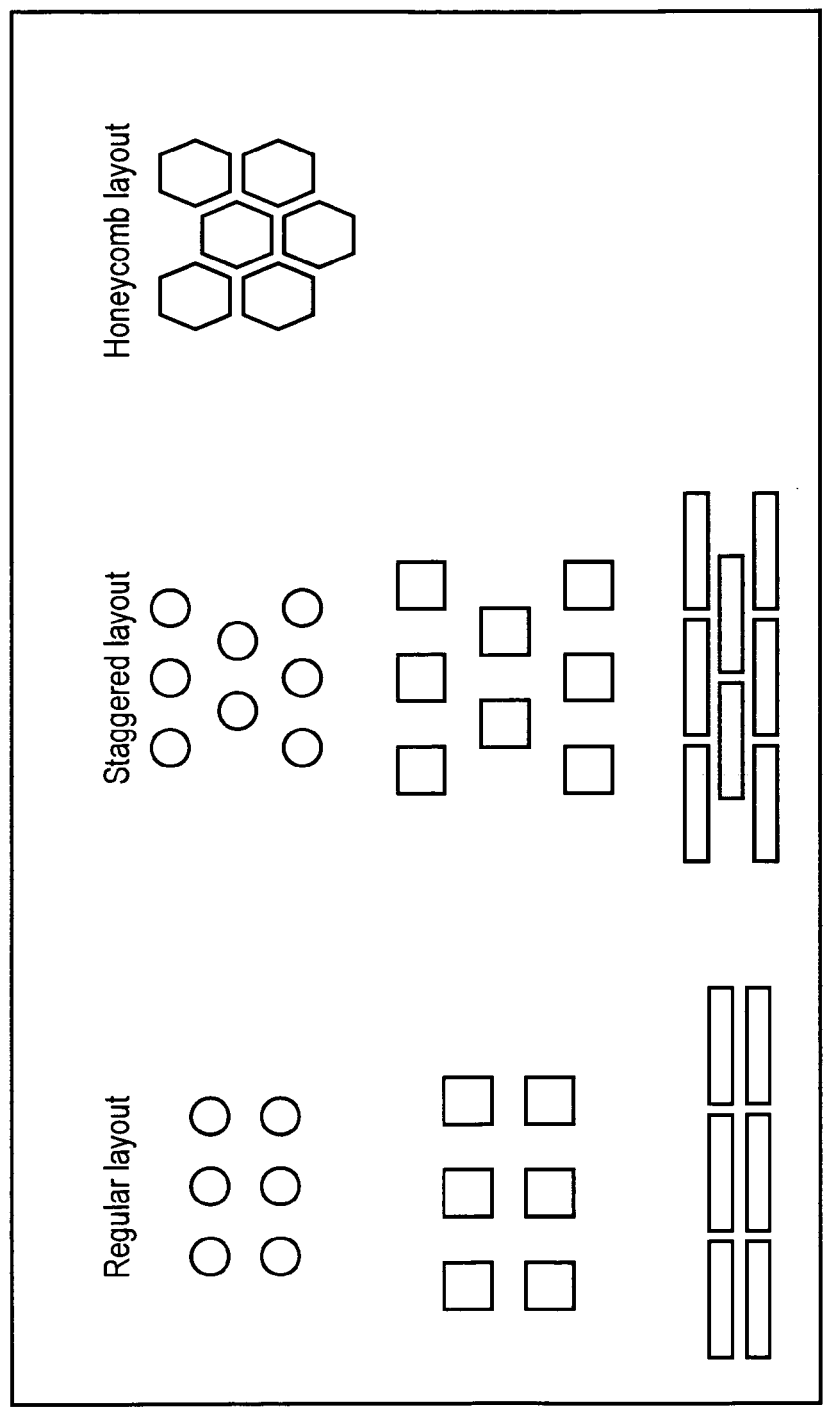
FIG. 3 is a diagrammatic illustrations of different shapes and layouts of perforations.

The difficulty of the problem increases when we need to consider the various kinds of perforated sheets, from circle holes to arbitrary ones. FIG. 3 shows some perforated pattern examples of the kind of holes and layout that can be expected. Mixed arrays of different shapes and/or sizes of perforation may also be present.

Figure 4:
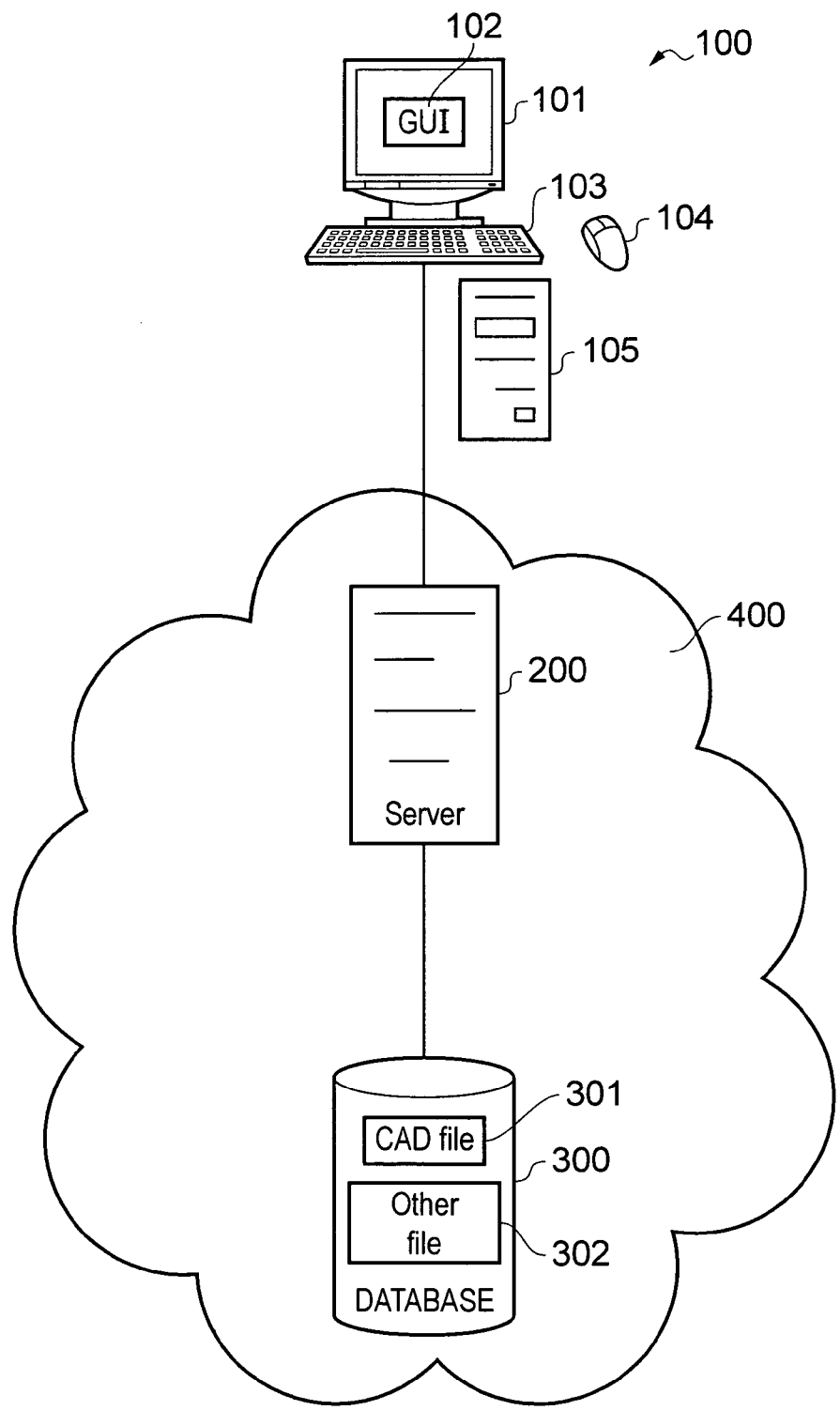
FIG. 4 is a schematic diagram illustrating components of hardware that can be used with invention embodiments.

FIG. 4 is a schematic diagram illustrating components of hardware that can be used with invention embodiments. In one scenario, the invention embodiments can be brought into effect on a simple stand-alone PC or terminal 100 shown in FIG. 4. The terminal comprises a monitor 101, shown displaying a GUI 102, a keyboard 103, a mouse 104 and a tower 105 housing a CPU, RAM, one or more drives for removable media as well as other standard PC components which will be well known to the skilled person. Other hardware arrangements, such as laptops, iPads and tablet PCs in general could alternatively be provided. The software for carrying out the method of invention embodiments as well as a CAD data file and any other file required may be downloaded, for example over a network such as the internet, or using removable media. Any modified CAD file can be written onto removable media or downloaded over a network.

Alternatively, PC 100 may act as a terminal and use one or more servers 200 to assist in carrying out the methods of invention embodiments. In this case, the CAD file 301 and/or software for carrying out the method of invention embodiments may be accessed from database 300 over a network and via server 200. The server 200 and/or database 300 may be provided as part of a cloud 400 of computing functionality accessed over a network to provide this functionality as a service. In this case, PC 100 may act as a dumb terminal for display, and user input and output only. Alternatively, some or all of the necessary software may be downloaded onto the local platform provided by tower 105 from the cloud for at least partial local execution of the method of invention embodiments.

Figure 5:
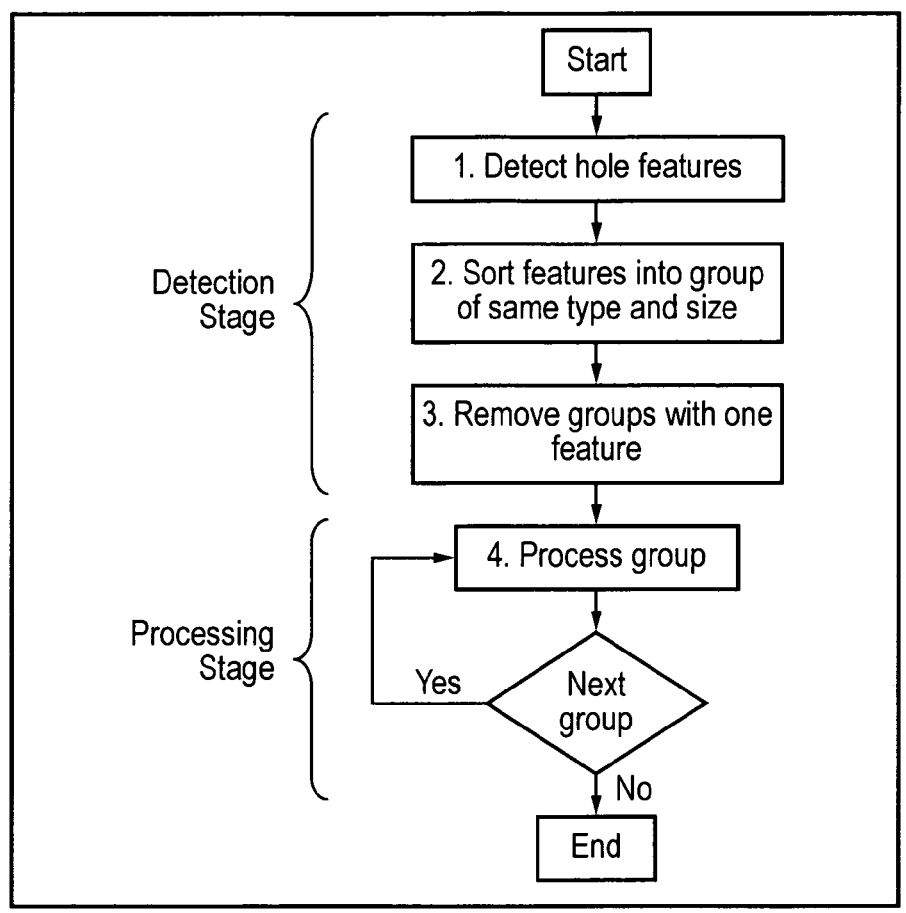
FIG. 5 is a flowchart of a CCMP process for groups of perforations.

FIG. 5 shows a flowchart of an automatic CCMP process from detection to processing the detected features. The two basic stages are automatic detection of a group of hole features (Detection Stage) and processing to detect that the group of holes forms an array of perforations and to replace the perforations with a porous equivalent portion (Processing Stage). The processing can look for perforations using a nearest-neighbour approach, or use the preferred bounding box methodology set out hereinbefore as a preferred embodiment. In step 1, hole features are detected. In step 2 the features are sorted into groups of the same size and type. In step 3 any group with a single feature is removed from consideration. If there is one hole only in a group, this means that the hole will not be a perforation. Steps 1, 2 and 3 form part of the detection stage. After detection there is the processing stage. In step 4 the group of holes is processed and a next group of holes is processed until there are no more groups to be processed.

Turning back to the detection stage, this particular embodiment uses a group of selected holes according to their size and type. In the first step of detecting hole features, different classes of holes may already have been identified. For example the methodology may detect three classes of hole; circular or oval holes, hexagon holes and rectangular holes. They can be sorted into groups in step 2 by checking the number of sides, their volume and the length of their sides for example. In an alternative scenario, only the hole volume might be considered so the groups could contain holes of different shapes. For example one group might contain both circular and triangular holes.

With either scenario, removing a group which has just one feature can avoid unnecessary processing of data that cannot belong to a group of perforations.

A technology for automatic feature detection of through holes is described in previous applications by the same applicant; PCT/EP2010/070605 and PCT/EP2010/070601. These applications are hereby incorporated by reference. The extra element at the detection stage added by invention embodiments may be sorting of the detected holes (any or all of which could be perforated features) into groups of the same type and/or size. This also helps identify and remove groups with just one feature that are not perforated features, as highlighted in FIG. 2.

The main focus of invention embodiments is the processing stage, processing one group (or type) at a time. This part is discussed below in more detail.

Figure 6:
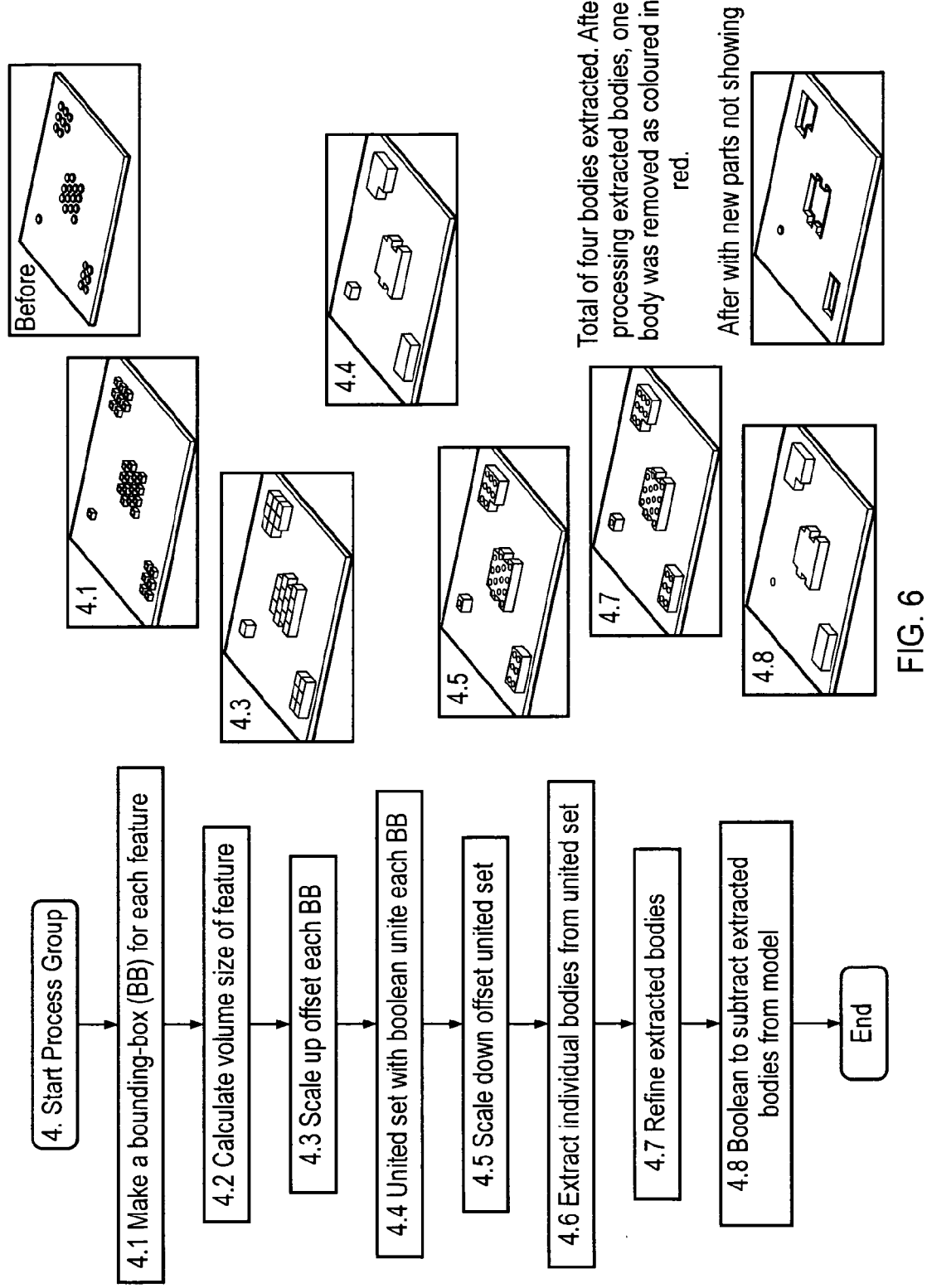
FIG. 6 is a flowchart of a part of the CCMP process, together with a depiction of the effect of the steps carried out on an exemplary part.

FIG. 6 is a flowchart with images of an example part in the various stages in the processing of a perforated region in a model. In this implementation, a group comprises only holes of the same shape and size. The images depict the change from a model with perforated regions of circular cross-section holes to a modified model with three new subparts. The steps in FIG. 6 are substeps of step 4 in FIG. 5 according to preferred invention embodiments.

In step 4.1 a bounding box is created for each hole (also referred to as a feature). The bounding box is created in a manner known to the skilled man. For any object defined in a geometric model, the upper and lower limit of the object is found in the x, y and z directions. From these measurements (or from the measurements of a target hole in a group of dissimilar holes as discussed below), a rectangular parallelepiped (a cuboid or cube) is formed. This is the bounding box which "encloses" a 3D part in Cartesian coordinates, extending (at least) from the lowest numerical value to the highest numerical value (of any portion) of the part in all three directions in a 3D Cartesian coordinate system.

In step 4.2, the volume of the bounding box is calculated. It may be that all bounding boxes are identical in size and shape, because the holes have been sorted into groups of identical sized and shaped holes, in which case the volume only needs to be calculated once. This is also true if unequal sized holes are used which would nominally have different size bounding boxes, but the process selects a bounding box size which is used for all the holes. For example, if one or more through holes requires a larger bounding box, the larger bounding box size may be used for all the through holes.

In step 4.3, each bounding box is increased in size. This scaling up process may be by using offsets. As mentioned previously, an offset may grow a box bigger in all dimensions equally. In one example, an offset may be 1 mm for holes of a diameter between 1 mm and 10 mm with a gap of 0.5 mm. The skilled reader will appreciate that different offsets are suitable for different sizes and spacings between the through holes. The offset value may be set by a user or re-set during a process if no overlaps occur in the scaling up stage. This is an operation that can be carried out using the graphical user interface (GUI) referred to earlier. If the GUI is used to visualise the bounding boxes (for example using a 3D representation as shown in FIG. 6) the user will be able to identify when the bounding boxes do not overlap. Otherwise a semi-automatic process or automatic process could increase the offset until at least one overlap is produced.

In step 4.4, the bounding boxes created in step 4.3 are united. This operation is sometimes referred to as a Boolean operation and means that all the bounding boxes are then treated as one part. In particular, any overlapping bounding boxes are combined to become a single bounding box. This can happen in separate areas of the same part. For example as shown in the image for step 4.3, different areas of perforation can form separate combined bounding boxes. In the example shown, there are three combined bounding boxes created by scaling up and a Boolean unite operation and one individual bounding box which has not been combined with any others because it is formed from a single through hole spaced from any arrays of perforation, as seen in the "Before" image at the start of processing.

In step 4.5 the offset of the united set is removed. This returns the united set to the right size (without any shift in the centre position of each individual body). The combined bounding boxes are scaled down but remain as one part.

In step 4.6, individual bodies are extracted from the united set. Extraction is in effect a reversal of the previous Boolean unite process.

Step 4.7 follows the identification method with a refinement of the extracted bodies, for example to remove individual holes which although selected as part of a group (by dint of their size and/or shape for example) are spaced from other holes and therefore do not form part of an array of perforations. Another possible refinement is to modify the shape of an extracted body to simplify it for easier processing. A third possible refinement is to include porosity, so that the method encompasses a modification step. This refinement stage is discussed in more detail below.

Finally in step 4.8, a Boolean subtraction operation is used to remove the perforations in the model. This makes the extracted new, porous bodies fit the model as sub-parts of the model. The replacement non-perforated (porous) bodies are now ready and form part of the model. Unfortunately, the model itself still has the perforated hole features. These are then removed by Boolean subtract operations with the new bodies. Effectively, the portion of the original model now intersecting each new body is subtracted from the model. The final image shown in FIG. 6 is the model without the porous bodies displayed, for comparison with the first image to show the changes to the original part.

Figure 7:
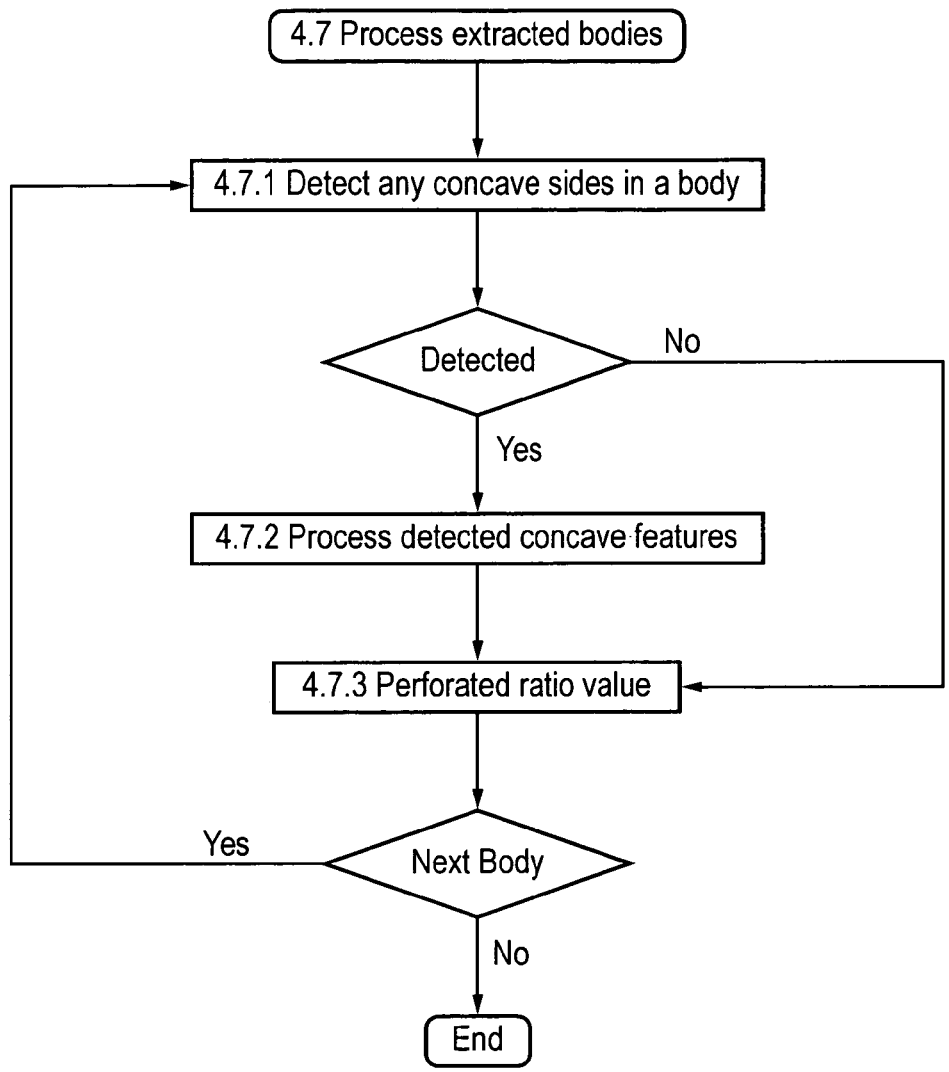
FIG. 7 is a flowchart of refinement steps carried out on extracted bodies.
Figure 8:
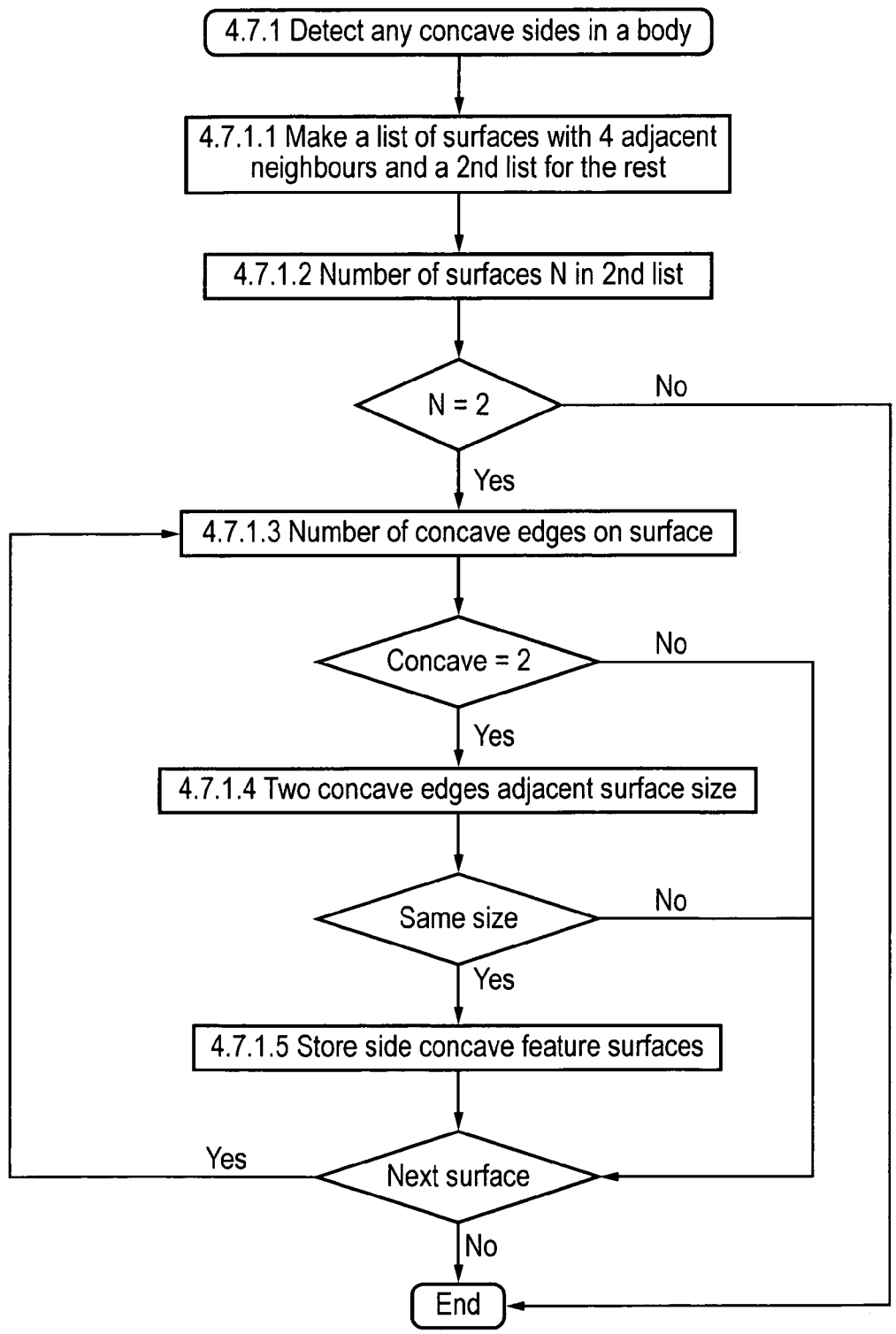
FIG. 8 is a flowchart of concave feature detection.
Figure 9:
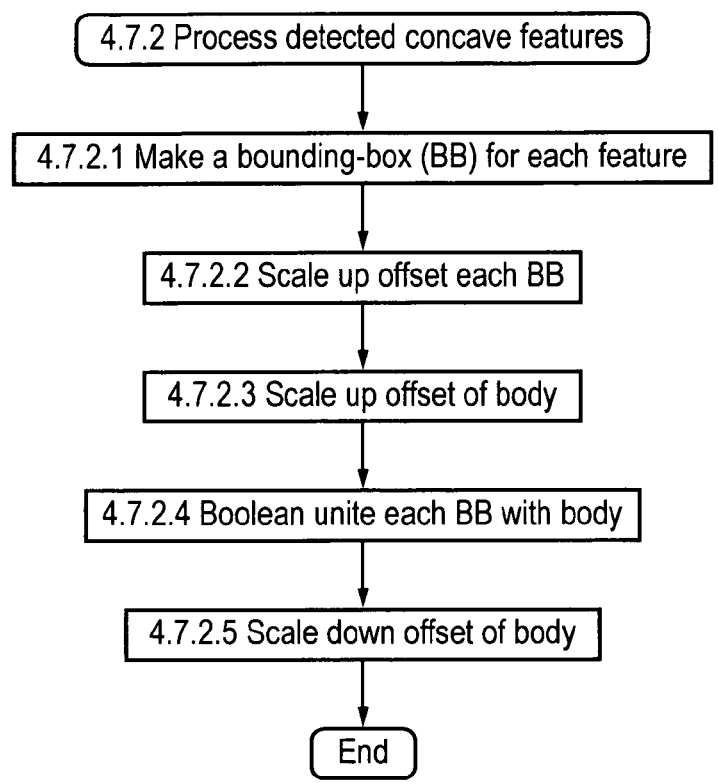
FIG. 9 is a flowchart of concave feature removal.
Figure 10A:
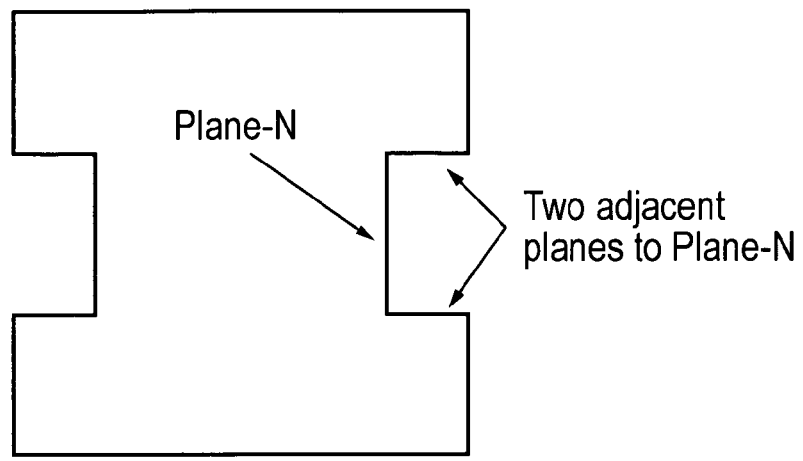
FIG. 10a is a top view of an extracted body with concave features
Figure 10B:
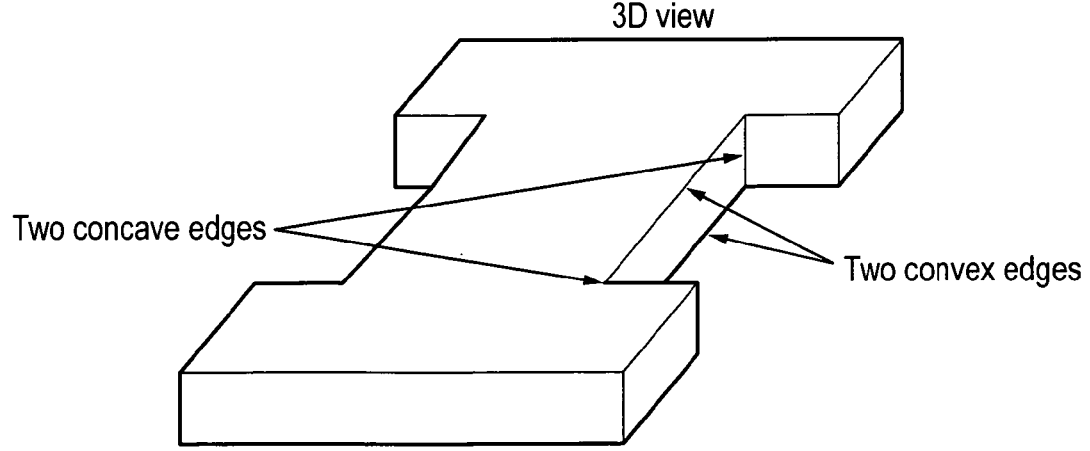
FIG. 10b is a 3D view of the same part.
Figure 11:
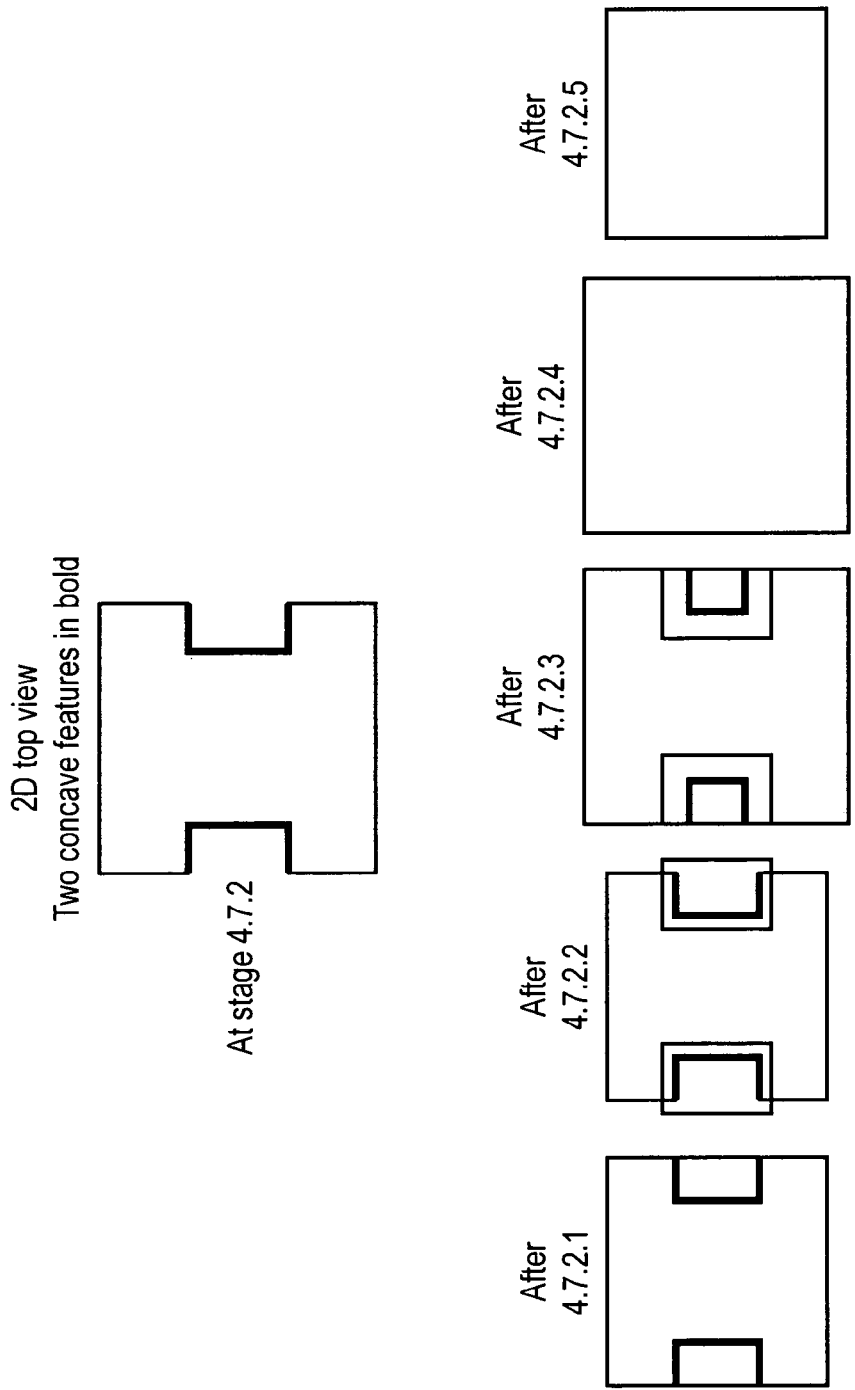
FIG. 11 is a top view of the processing of the same part during concave feature removal.

FIG. 7 is a flowchart of refining the extracted bodies, with the flowcharts of FIGS. 8 and 9 detailing the detection and processing of concave features. FIGS. 10*a* and 10*b* show an example of the concave feature process with concave and convex edges indicated. FIG. 11 provides images of the corresponding processing in the FIG. 9 flowchart for an exemplary combined bounding box. This is followed by perforated ratio value detailed in the FIG. 13 flowchart for each of the bodies. According to this embodiment, it is at this stage that any bodies consisting of a single feature are removed. To help users, the new bodies can be named "punched_sheet_x.xxxxx", where the perforated ratio value is included in the x.xxxxx part.

In the particular embodiment discussed in detail herein, refinement of the extracted bodies in step 4.7 of FIG. 7 takes place by first detecting any concave features in a body in step 4.7.1, processing those features in step 4.7.2 if they are detected and then moving to step 4.7.3 to provide a perforated ratio value for the body in question. Once one extracted body has been refined this way, the next body is refined, until all the bodies have been treated. In this particular embodiment, the protection of single isolated holes takes place as part of the perforated ratio value derivation. However, this could also take place as a separate step at any point in stage 4.7.

FIG. 8 presents a flowchart, for stage 4.7.1 (detection of any concave features in a body). As an example of a suitable body for processing, FIG. 10 shows the views of a body with two concave features, one to either side. Such a body may be formed from a combination of bounding boxes around the staggered layout shown in FIG. 3.

In the detection stage, 4.7.1, the first step is to separate the planes of a body into a list of planes with four adjacent neighbours and a second list for any planes which do not have four adjacent neighbours. For example looking at the body in FIG. 10, the top and bottom surfaces have more than 4 adjacent planes and all the other surfaces have four adjacent planes only. Thus the number of planes in the second list is two and the detection continues with step 4.7.1.3 which treats one plane at a time. First of all it is determined for the plane in question how many concave edges are present. If there are two concave edges (for example as shown in FIG. 10*b* for one of the side surfaces) the processing continues. In step 4.7.1.4 the planes at the two concave edges are compared. If they are of the same size the processing continues. These adjacent planes are the surfaces bordering the side surface mentioned above. The two conditions of the concave edges and the adjacent planes being of equal size have checked for a concave characteristic that can be processed. In feature 4.7.1.5 the feature is saved along with the plane and the two adjacent planes. The process then carries on to treat the next plane in step 4.7.1.3.

In FIG. 9 detailed processing of detected concave features in step 4.7.2 is set out. FIG. 11 shows the effect of the processing on two concave features detected in step 4.7.1 in the extracted body shown in FIGS. 10*a* and 10*b*.

At step 4.7.2.1 in FIG. 9 a bounding box is created for each concave feature. In step 4.7.2.2 the bounding box is scaled up in the same way as described previously for bounding boxes. In step 4.7.2.3 the body is scaled up by the same amount. These two steps may take place in a different order or in fact be combined as one step. In step 4.7.2.4 there is a Boolean unite operation, so that each bounding body is united with the body. Finally, in step 4.7.2.5, the body is shrunk by the same offset, resulting in a body of a simplified shape with the concave features removed. As explained previously, this scaling up, uniting and scaling down process is primarily useful to eliminate minor rounding errors in storage and make sure that the bounding boxes and original body with concave features are properly combined.

Figure 12:
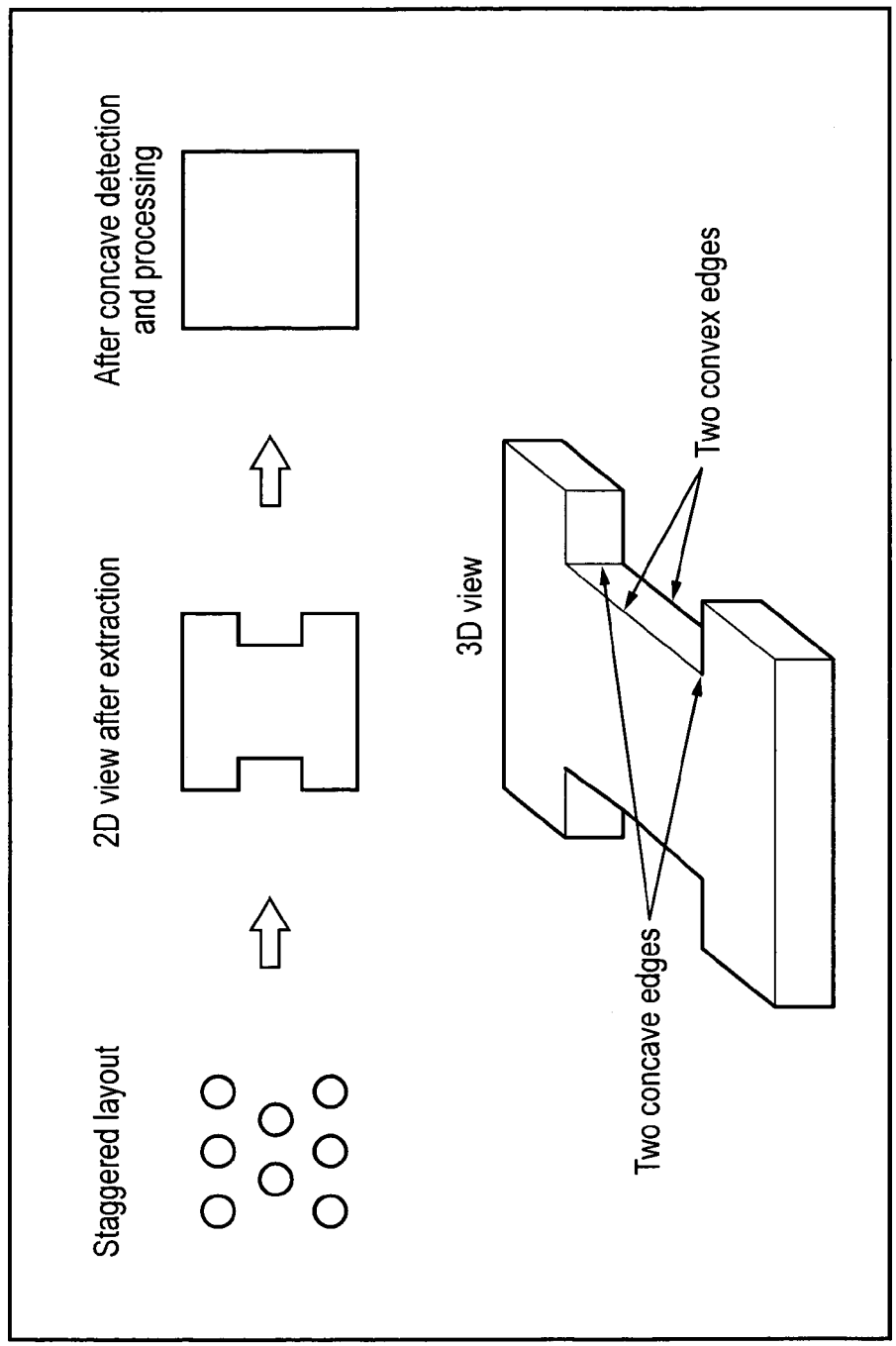
FIG. 12 is a pictorial example of the conversion of an array of perforations to a final replacement shape.

FIG. 12 is a pictorial example of the conversion of a staggered layout of perforations to an extracted body with the complex shape and then to a simplified shape with the concave features removed.

Figure 13:
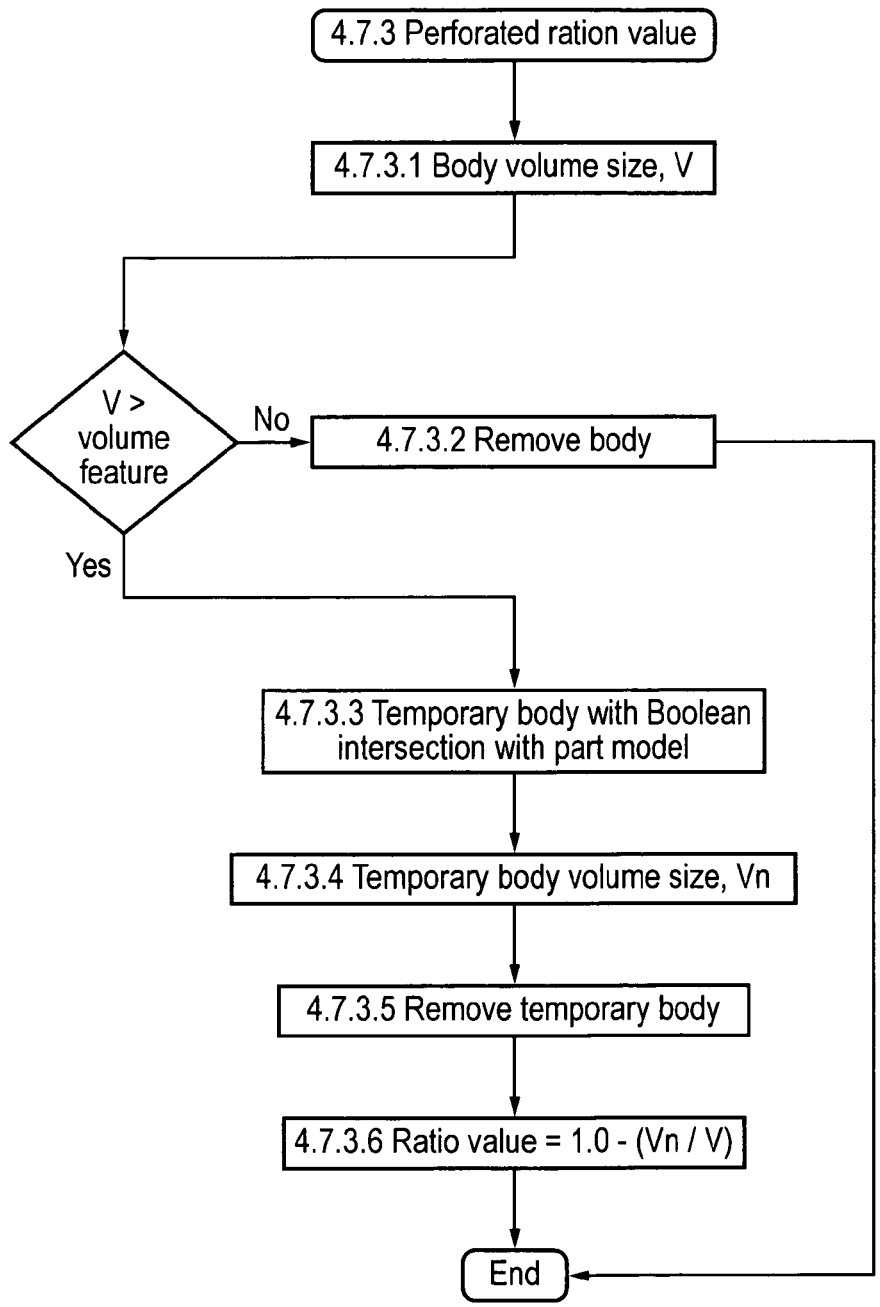
FIG. 13 is a flowchart showing calculation of a porosity value.

FIG. 13 shows the detailed steps in stage 4.7.3 in which a perforated ratio value is detected and implemented for a body. In a first step 4.7.3.1 the body volume size V is detected and compared with the volume of an individual hole bounding box. If the body volume is greater, then the process continues, otherwise the body is removed from further processing in 4.7.3.2 as a single hole feature.

The rest of the process is a way of calculating the porosity of the body without knowing the number of holes in the body. If the Boolean unite process which took place previously only formed one combined body, there is no need for these further steps because the number of holes is simply the number of holes detected originally in the group. However, if several bodies have been provided after combination these will correspond to separate arrays of perforations and/or completely separate holes which were removed in step 4.7.3.2. In this case, the information as to the number of holes in each body may have been lost and it is necessary to reintroduce information into the process in order to calculate how porous the replacement body will need to be to take account of the original holes. This can be effected in the following steps.

First in step 4.7.3.3 a temporary body is created for calculation purposes. This is by Boolean intersection of the extracted body with the part model. In step 4.7.3.4, the temporary body volume size Vn is calculated. This effectively subtracts the size of the holes from the volume. In step 4.7.3.5 the temporary body is removed, since it was only provided for calculation and not as a "real" body forming part of the model. In step 4.7.3.6, the ratio value for porosity is calculated as 1.0–(Vn/V). FIG. 14 shows the extracted body volume size V which is shown to the right without simplification to remove concave features and to the left with simplification to remove the concave features. Below, there is depiction of a corresponding temporary body with volume size Vn. The skilled reader will appreciate that the porosity of the body without concave features will be lower, but the region of porosity will be larger.

Graphical User Interface

Some objects of the GUI tool are to:
1. Provide users with a graphical environment with processing tools for CAD model processing—with the automatic feature detection and modification technologies described above.
2. To view the features failed in the modification process (perhaps first to run feature detection to show these features) and then help users towards a remedy with toolset functions in the GUI.
3. To give the ability to view and share models between users at different locations via a network/communication medium.

The GUI aspect provides a graphical environment with 3-dimensional display of CAD models. User input functionality may be provided conventionally, with for example a mouse and a keyboard. FIG. 15 provides an outline of an on-screen display environment, and FIGS. 16 to 18 are flowcharts of the GUI CAD model processing.

FIG. 15 shows an outline view of a GUI front end of the basic arrangement. A top menu bar 50 provides basic features of exit, load and save model, auto detection, user pick feature, feature processing with the results of accept or reject and any other suitable tools. A feature menu bar 60 below the top menu bar gives selected capabilities of removing small parts, holes, blends, chamfers, cylinders and other parts or modifying for example holes and cylinders as well as the perforation detection and modification described in detail herein. In the feature menu bar, the option Dn is the distance gap value between holes, and Cn is the option to remove concave-side features or not. Both options are also available in a batch mode version which may not need input using the GUI.

In the screen portion below the feature menu bar the screen is divided into three; a model part tree-view window 70 indicating which part of a model is being processed, a feature tree-view window 80 showing the features being processed and a 3D selected part window 90 highlighting detected features. In the lowermost portion of the screen there is also a division into three windows, a 3D model display window which shows a representation of the model, a result text window which gives the result of a process in text form, for example listing features detected and a defeaturing (modification) result. Finally a 3D result window shows the part as modified by the process.

In the feature tree-view window each feature displayed for selection is a group of holes of the same type or a group formed by a combination of hole types which is user specified using the feature characteristic method, for example combining triangle and circle holes of the same volume together. Unselecting a feature entails unselecting a group of holes for display and processing.

FIG. 16 shows an overall logical flow of functions within a GUI according to invention embodiments. The process starts at step S200 and in step S201 the menu and window layout is loaded. At step S202 a model is loaded or saved. Once the model has been loaded and saved into the system the process can continue with a feature type selection S203. For example, the feature selected may be perforations. In step S204 such features may be detected. In step S205 the user can manually pick the feature. In step S206 the feature is processed. Step S207 provides any other relevant functionality. At any point after one of these steps, a new model can be loaded or the current model saved and the process can exit in step S208.

FIG. 17a is a more detailed flow chart of the auto detect feature of step S204 on FIG. 16. The process starts at 5300 and auto detects a selected feature type in step S301. In the next step S302, the features found are listed in the feature tree-view window shown in FIG. 15. In step S303 the features are highlighted on the part which is currently undergoing processing in the 3D selected part window.

FIG. 18 is a more detailed explanation of the process feature step shown as S206 in FIG. 16. The processing starts at S400 and processes features of the selected type in S401. In S402 the result text window outputs a number of features failed and the feature tree-view window unmarks processed features. In step S403 the 3D selected part window highlights failed features on the part and the 3D result window displays the results of the processing. If the result is accepted by the user in step S404 then the 3D selected part window is updated, if not the 3D result window is cleared and the feature tree-view window is cleared. Equally after updating the 3D selected part window these two windows are cleared. The process returns to the main loop in S407.

Finally, for the avoidance of doubt it is noted that invention embodiments also provide a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A computer-implemented method of simplifying a geometrical model including through holes, by replacing through holes in the geometrical model, comprising:
  automatically identifying a potential group of through holes in a geometric model, by
  providing a separate bounding box surrounding each through hole in a set of through holes;
  calculating the volume of each separate bounding box;
  increasing the size of each separate bounding box by an offset factor which adjusts the highest and lowest extent of the bounding boxes equally and oppositely in at least one of the mutually perpendicular x, y, and z directions, so that at least two of said separate bounding boxes overlap;

creating a united set of all the bounding boxes, whereby overlapping separate bounding boxes become a single combined bounding box;

reducing the size of each bounding box in the united set by the offset factor; and extracting from the united set the one or more individual bodies formed by the one or more reduced-size bounding boxes, each individual body potentially representing a group of through holes; and replacing one or more portions of the geometrical model corresponding to the one or more individual bodies with one or more porous replacement positions.

2. A computer implemented method according to claim 1, further including selecting the set of through holes so that it includes through holes having the same volume.

3. A computer implemented method according to claim 1, further including selecting the set of through holes so that it includes through holes having the same or a similar shape.

4. A computer implemented method according to claim 1, further including;

deselecting any individual body whose volume corresponds to that of a separate bounding box, any remaining individual bodies each corresponding to an identified group of through holes.

5. A computer implemented method according to claim 1, further including;

processing the individual bodies, to detect and replace any concave characteristics.

6. A computer implemented method according to claim 5, wherein the concave characteristics are detected by searching for surfaces on the individual bodies which have exactly two concave edges of the same size.

7. A computer implemented method according to claim 5, wherein the concave characteristics are replaced for one individual body by providing a cavity bounding box to fill in each cavity detected.

8. A computer implemented method according to claim 7, further including increasing the dimensions of each cavity bounding box and the dimensions of the individual body by a cavity offset factor, creating a united set of all the cavity bounding boxes and the individual body to combine the cavity bounding boxes and individual body, and decreasing the dimensions of the body thus created by the offset factor.

9. A computer implemented method according to claim 1, further including;

deriving a porosity of the individual bodies and forming part of the geometric model, by taking into account porosity introduced by the through holes in the identified group of through holes.

10. A computer implemented method according to claim 1, wherein the porosity of the individual body is derived by using a ratio between the volume of the individual body and the volume of a temporary part, which is created to be identical in size, position and shape to the individual body but whose volume is reduced by the group of through holes.

11. A computer implemented method according to claim 9, further including;

processing the geometric model to replace a portion of the geometric model which corresponds to the porous individual body and includes the through holes in the identified group of through holes with the porous replacement portion.

12. A graphical user interface for a computer-implemented method of identifying a potential group of through holes in a geometric model including through holes; wherein the graphical user interface when operated:

displays the geometric model including the through holes;

allows manual selection of a through hole detection procedure, in which through holes are automatically detected, lists the detected through holes and highlights them on the part of the geometric model undergoing processing, allows selection of processing of the features comprising grouping together the through holes forming an array of through holes by:

provides a separate bounding box surrounding each through hole in a set of through holes;

calculates the volume of each separate bounding box;

increases the size of each separate bounding box by an offset factor which adjusts the highest and lowest extent of the bounding boxes equally and oppositely in at least one of the mutually perpendicular x, y and z directions, so that at least two of said separate bounding boxes overlap;

creates a united set of all the bounding boxes, whereby overlapping separate bounding boxes become a single combined bounding box;

reduces the size of each bounding box in the united set by the offset factor; and extracts from the united set the one or more individual bodies formed by the one or more reduced-size bounding boxes, each individual body potentially representing a group of through holes;

replaces one or more portions of the geometrical model corresponding to the one or more individual bodies with one or more porous replacement portions; and displays the geometric model after the replacement.

13. A non-transitory computer-readable medium storing a computer program which when executed on a computing device carries out a computer-implemented method of simplifying a geometrical model including through holes, by replacing through holes in the geometrical model, comprising:

automatically identifying a potential group of through holes in a geometric model, providing a separate bounding box surrounding each through hole in a set of through holes;

calculating the volume of each separate bounding box;

increasing the size of each separate bounding box by an offset factor which adjusts the highest and lowest extent of the bounding boxes equally and oppositely in at least one of the mutually perpendicular x, y and z directions, so that at least two of said separate bounding boxes overlap;

creating a united set of all the bounding boxes, whereby overlapping separate bounding boxes become a single combined bounding box;

reducing the size of each bounding box in the united set by the offset factor; and extracting from the united set the one or more individual bodies formed by the one or more reduced-size bounding boxes, each individual body potentially representing a group of through holes; and replacing one or more portions of the geometrical model corresponding to the one or more individual bodies with one or more porous replacement positions.

14. A computer apparatus arranged to automatically simplify a geometrical model including through holes, by replacing through holes in the geometrical model, the computer apparatus comprising:
- a non-transitory computer readable memory and one or more processors, wherein the one or more processors are configured to:
- identify a potential group of through holes in a geometric model including through holes;
- provide a separate bounding box surrounding each through hole in a set of through holes;
- calculate the volume of each separate bounding box;
- increase the size of each separate bounding box by an offset factor which adjusts the highest and lowest extent of the bounding boxes equally and oppositely in at least one of the mutually perpendicular x, y and z directions, so that at least two of said separate bounding boxes overlap;
- create a united set of all the bounding boxes, whereby overlapping separate bounding boxes become a single combined bounding box;
- reduce the size of each bounding box in the united set by the offset factor; and
- extract from the united set the one or more individual bodies formed by the one or more reduced-size bounding boxes, each individual body potentially representing a group of through holes.

* * * * *